US009595144B2

(12) United States Patent
Kolavennu et al.

(10) Patent No.: US 9,595,144 B2
(45) Date of Patent: Mar. 14, 2017

(54) ACCESS MONITOR USING WIRELESS DEVICES

(71) Applicant: Honeywell International Inc., Morristown, NJ (US)

(72) Inventors: Soumitri N. Kolavennu, Blaine, MN (US); Uday Pulleti, Andhra Pradesh (IN)

(73) Assignee: Honeywell International Inc., Morris Plains, NJ (US)

( * ) Notice: Subject to any disclaimer, the term of this patent is extended or adjusted under 35 U.S.C. 154(b) by 125 days.

(21) Appl. No.: 14/594,922

(22) Filed: Jan. 12, 2015

(65) Prior Publication Data

US 2016/0203662 A1 Jul. 14, 2016

(51) Int. Cl.
*G05B 9/00* (2006.01)
*G07C 9/00* (2006.01)

(52) U.S. Cl.
CPC ...... *G07C 9/00111* (2013.01); *G07C 9/00309* (2013.01); *G07C 2209/63* (2013.01)

(58) Field of Classification Search
CPC ............ G07C 2009/00785; G07C 9/00; G07C 9/00007; G07C 9/00111; G08C 17/02; G08C 2201/91; H05B 37/0227
USPC ................................................ 340/5.61-5.63
See application file for complete search history.

(56) References Cited

U.S. PATENT DOCUMENTS 5,329,117 A * 7/1994 Galili ................... A47K 5/1217 250/214 B
2004/0183682 A1 9/2004 Tenarvitz
2009/0082034 A1 3/2009 Gray et al.
2013/0241694 A1 9/2013 Sharma et al.
2014/0373447 A1 12/2014 Gunreben
2015/0070133 A1* 3/2015 Cuppen .................... G07C 9/00 340/5.61

FOREIGN PATENT DOCUMENTS

DE 202005014179 U1 3/2006
DE 102011121775 B3 1/2013

OTHER PUBLICATIONS

European Application Serial No. 16150322.2, Extended European Search Report mailed Jun. 8, 2016, 7 pgs.

* cited by examiner

*Primary Examiner* — Ojiako Nwugo
(74) *Attorney, Agent, or Firm* — Schwegman Lundberg & Woessner, P.A.

(57) ABSTRACT

A system includes a first sensor supported proximate an opening having an RF attenuating material such that signals emitted from first sensor are stronger on a first side of the opening than on a second side of the opening and a second sensor supported proximate the opening having an RF attenuating material such that signals emitted from the second sensor are stronger on the second side of the opening than on the first side of the opening.

20 Claims, 4 Drawing Sheets

ACCESS MONITOR USING WIRELESS DEVICES

BACKGROUND

Access control mechanisms play an important role in providing physical security to industrial areas, buildings, rooms, hotels, government installations, hospitals, and other areas. Many different mechanisms are used for access control based on proximity of a user.

SUMMARY

A system includes a first sensor supported proximate an opening having an RF attenuating material such that signals emitted from first sensor are stronger on a first side of the opening than on a second side of the opening and a second sensor supported proximate the opening having an RF attenuating material such that signals emitted from the second sensor are stronger on the second side of the opening than on the first side of the opening.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media or computer readable storage device such as one or more memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Many different mechanisms are used for access control based on proximity of a user. However, such mechanisms lack an ability to provide information related to the direction of access. In other words, whether a user is entering or leaving an area. Such information can be useful for many different purposes, such as to provide customized services based on direction of access. For a hotel room, access should be provided to the guest when entering the room, and also, the door should be locked after the guest enters the room. Certain amenities can be provided to the guest when they enter the room, like turning on lights, air conditioning and other services, and similarly turning such services off when leaving the room. For an industrial plant or other commercial or government area, workers may have access to certain areas during certain periods. It becomes important to know that the person has exited the area during prior to expiration of the permitted periods.

A sensor infrastructure mounted on both sides of an opening are configured to detect direction of a wireless device moving through the opening. The sensors may be mounted on attenuation material such that transmitted and received signals of the sensor are attenuated in one direction. Thus, a sensor on one side of the door sends and receives signals with more strength on that side of the door, while a sensor on the other side of the door does the same with respect to signals on that corresponding side of the opening.

Figure 1:
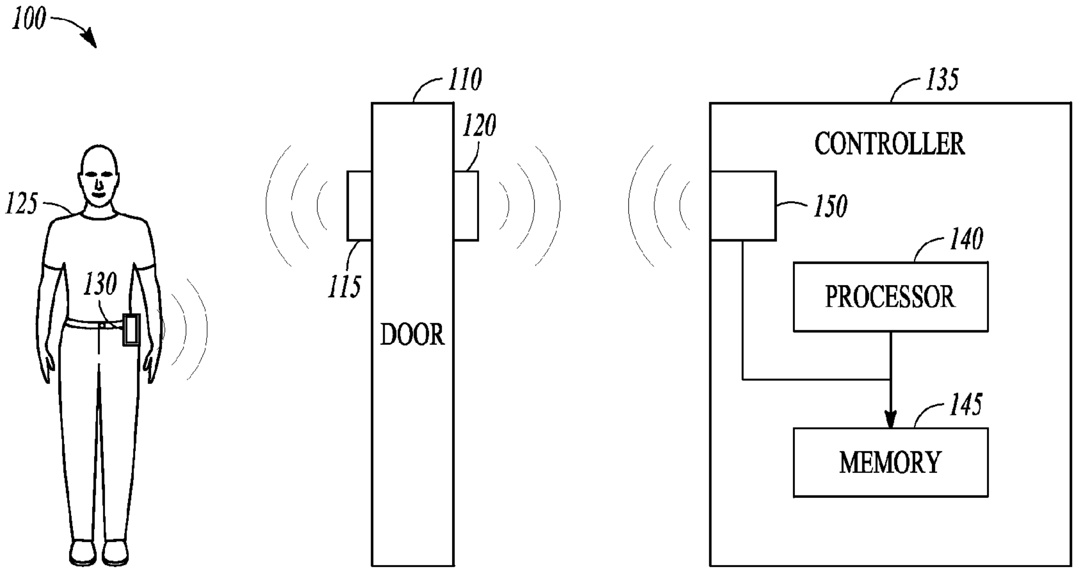
FIG. 1 is a block diagram of a system for monitoring direction of movement of a device through an opening according to an example embodiment.

An example system 100 is illustrated in block form in FIG. 1. An opening, such as door 110 includes a first beacon or sensor 115 located on a first side of the opening 110 and positioned on an RF attenuating material such that signals sent, and/or received from the sensor 115 have a stronger signal strength on the first side of the opening than on the second side of the opening. A second beacon or sensor 120 is similarly located on a second side of the opening 110 and positioned on an RF attenuating material such that signals sent, and/or received from the sensor 120 have a stronger signal strength on the second side of the opening than on the first side of the opening.

In one embodiment, a person 125 or item, such as a pallet, box, equipment, or other item includes a wireless device 130 that receives signals from the sensors 115 and 120. In one embodiment, the device and sensors implement a short range wireless communication protocol, such as Bluetooth®, or Bluetooth Low Energy (BLE), and include a beacon or sensor identifier and a device identifier to ensure communications are associated with the proper beacons and devices. When the device 130 is on the first side of the opening 110, signals from sensor 115 are received with a higher signal strength than signals from sensor 120. Similarly, signals received by the sensor 115 from the device 130 are also stronger than signals received by the sensor 120 from the device 130. By subtracting the signals and comparing to a threshold, it may be determined which side of the opening the device 130 is in. The direction of travel may be determined by performing the subtraction multiple times as the device moves toward, through, and away from the opening.

In one embodiment, the sensors may perform the calculations based on signals received from the device responsive to the sensors. The signals may be provided to a central controller 135, which may include a processor 140, memory 145, and communications module 150. The memory 145 may include programming for execution by the processor 140 to calculate the direction of travel of the device through the opening. The signals may be provided wirelessly or via a wired connection in various embodiments. In one embodiment, the device 130 may be a mobile phone or other smart wireless device that measured signal strength received from the sensors 115 and 120, and transmits the received signal strength information to the controller 135. Thus, the direction of travel can be determined by received signal strength at either the device 140, the sensors 115 and 120, or both in various embodiments.

Figure 2:
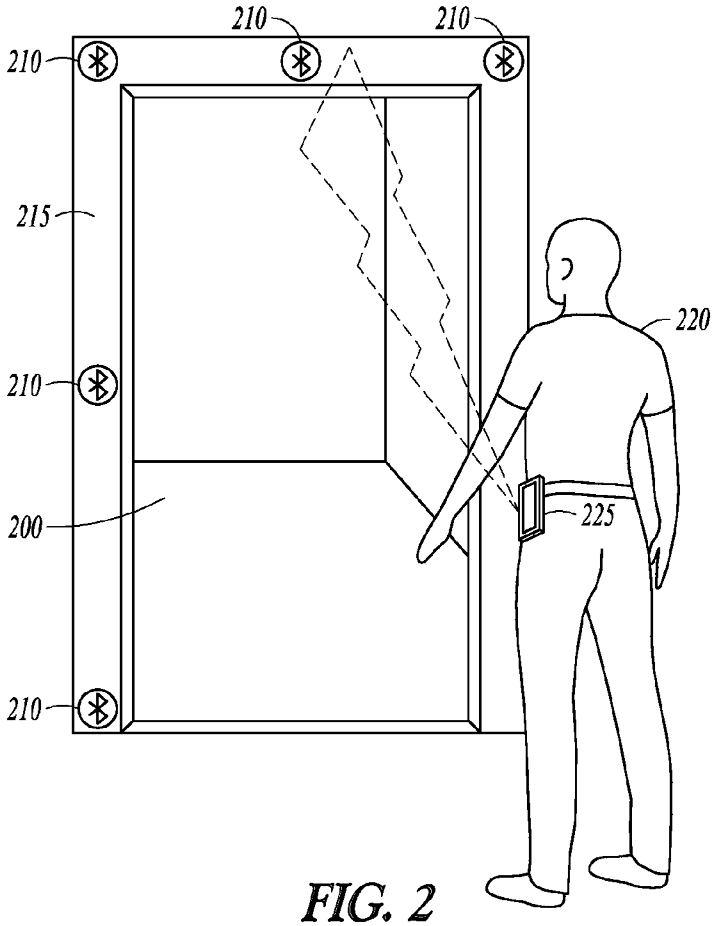
FIG. 2 is a perspective representation of an opening with a person wearing a device on a first side of the opening according to an example embodiment.

FIG. 2 is a perspective representation of an opening 200 having multiple sensors 210 dispersed along a first or front side of a door frame 215 on an attenuation material that attenuates signals from the sensors toward a rear side of the door frame. A person 220 is shown on the first side of the door frame 215 and is wearing a wireless device 225 that communicates with the sensors. In one embodiment, the sensors operate as a beacon in accordance with an implemented short range wireless protocol, with the device responding to the beacons. The multiple sensors may be positioned to provide redundant information, ensure full range coverage of the opening 200, which may be a quite large opening, such as a garage or warehouse door, may be positioned to ensure obstructions do not interfere with the signals, or may be provided and fused together for better accuracy. In addition, information from sensors and multiple doors that are spaced from each other and within range of the sensors may also be fused to validate and confirm which door is being passed through.

Such a fusion from multiple sensors or may include looking at relative signal strengths and selecting the strongest signal strengths corresponding to the device moving close to and just through an opening being selected to confirm the device went through that opening. In further embodiments, further information regarding the path and velocity of the device may be derived from the received signals. An average of signal differences may be used from multiple sensors on each side of one door to increase accuracy.

Figure 3:
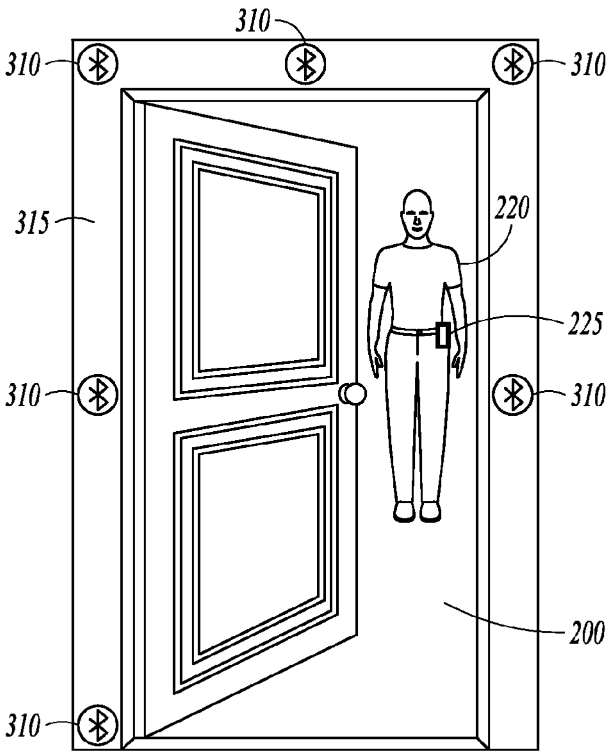
FIG. 3 is a perspective representation of the opening of FIG. 2 from another side of the opening according to an example embodiment.

FIG. 3 is a perspective representation of the opening 200 from a rear side of the opening. The rear side of the opening also has multiple sensors 310 dispersed along a second or rear side of a door frame 315 on an attenuation material that attenuates signals from the sensors toward the front side of the door frame. The person 220 is shown on the first side of the door frame 215 in the same position as in FIG. 2, and is wearing the wireless device 225 that communicates with the sensors 210 and 310. In one embodiment, the sensors 310 operate in the same manner as the sensors 210.

Figure 4:
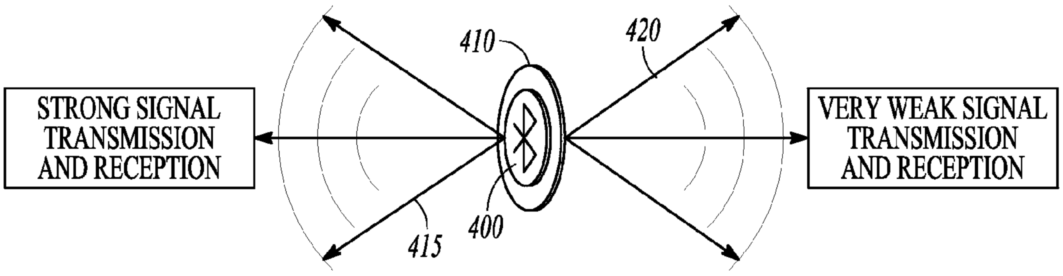
FIG. 4 is a perspective view of a sensor disposed on attenuating material according to an example embodiment.

FIG. 4 is a perspective view of a sensor 400 disposed on an attenuation material 410. Signal transmission, as well as signal reception from the sensor 400 away from the attenuation material 410 are represented by lines 415, and are stronger than signals 420 transmitted or received through the attenuation material 410. Signals 420 are thus weaker than signals 415. In one embodiment, the attenuation material may be integrated with the sensor, covering one side at least proximate an antenna of the sensor to block or attenuate signals transmitted in the direction or received from that direction. In further embodiments, the opening, or door may be formed of attenuation material, with the sensors being mounted or attached to the attenuation material to attenuate signals. The sensors may be mounted in a depression in the attenuation material, or the opening such that they are flush with the opening in some embodiments.

Figure 5:
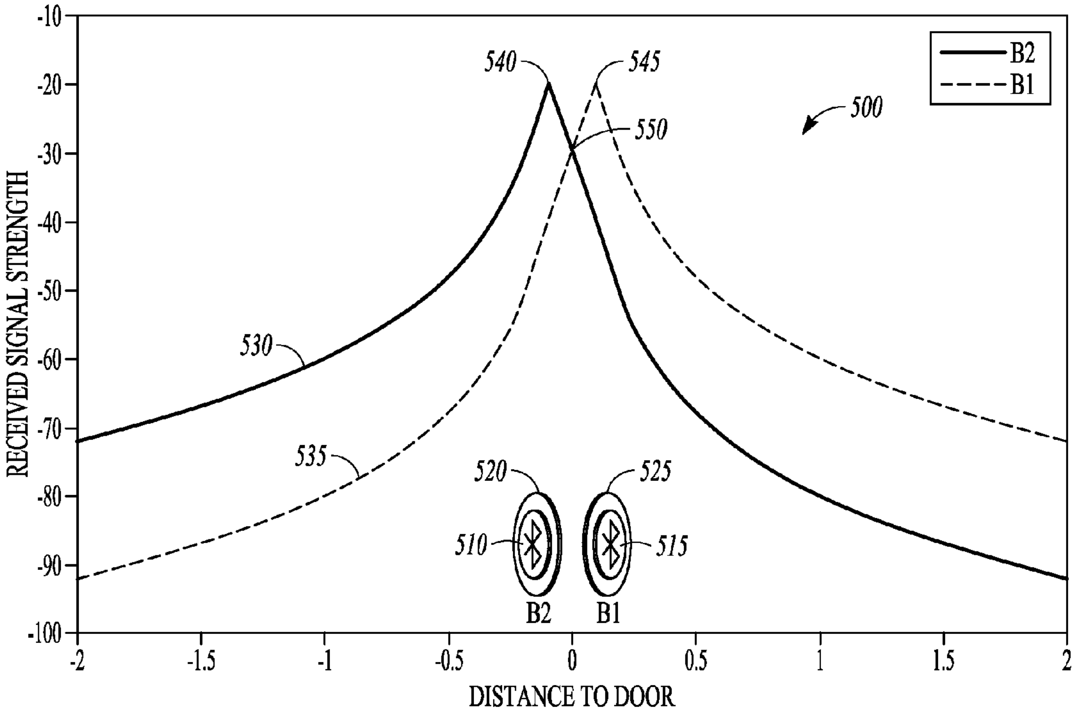
FIG. 5 is a graph illustrating signal strength versus distance according to an example embodiment.

FIG. 5 is a graph 500 illustrating signal strength decrease from transmitted strength in the form of dB reduction for varying device positions with respect to a pair of sensors mounted on opposite sides of an opening. Attenuation material blocks each sensor's transmitted and received signals opposite the side they are mounted on, or opposite an attenuation material from the sensors. Note that the sensors may be mounted on the same side of the opening when the sensors utilize attenuation material with opposite orientations.

Graph 500 includes two sensors, 510 and 515, which are shown about a zero distance from the opening. Sensor 510 includes attenuation material 520 which attenuates signals from the right side of the graph shown as positive distance from the door. Sensor 515 includes attenuation material 525 which attenuates signals from the left side of the graph shown as negative distance from the door. Signals corresponding to sensor 510 are illustrated at a line 530, while signals corresponding to sensor 515 are illustrated at a line 535.

Signals 530 corresponding to sensor 510 are stronger than signals 535 at the left of the door, with a peak signal 540 occurring at the sensor 510 and decreasing to the right of the sensor 510. Signals 535 are stronger than signals 530 to the right of the door, with a peak signal 545 occurring at the sensor 515. Note that the signal strength is equal at one point 550 corresponding to the middle of the door, or half way between the sensors 510 and 515. Directional information is available from the signals corresponding to the sensors at just about every point except about the middle at point 550 where the difference between the signals may not exceed the threshold.

Figure 6:
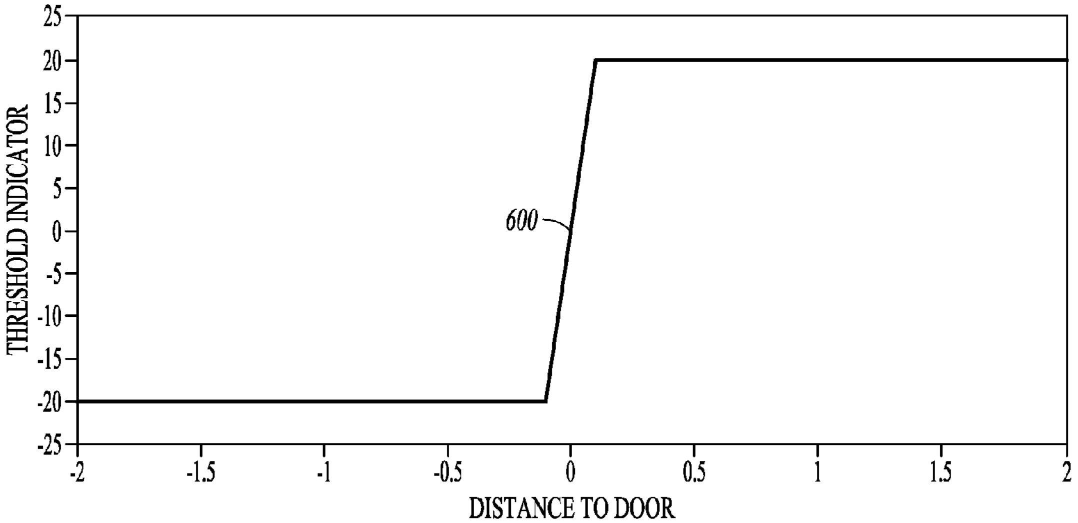
FIG. 6 is a graph illustrating a difference in signal strength for various positions of a device with respect to an opening according to an example embodiment.

FIG. 6 is a graph illustrating the difference in signal strength 600 corresponding to signals 530 and 535. Note that the signal strength difference is fairly constant to the left of the door, and then transitions to an opposite and again fairly constant strength as the device moves through the door and moves to the right of the door.

In one embodiment, the sensors or devices include circuitry to obtain received signal strength indications representative of distance from the opening of a device receiving the signals. The circuitry may be a processor and program in one embodiment. The processor becomes programmed circuitry when executing the program. In a further embodiment, the device comprises a smart phone that receives the beacon signals, determines a strength of the received beacon signals, and transmits the determined strength and a smart phone identifier. Alternatively, the beacons receive device responses to the signals emitted from the beacons. In one embodiment, the first and second beacons comprise short range wireless transceivers.

Figure 7:
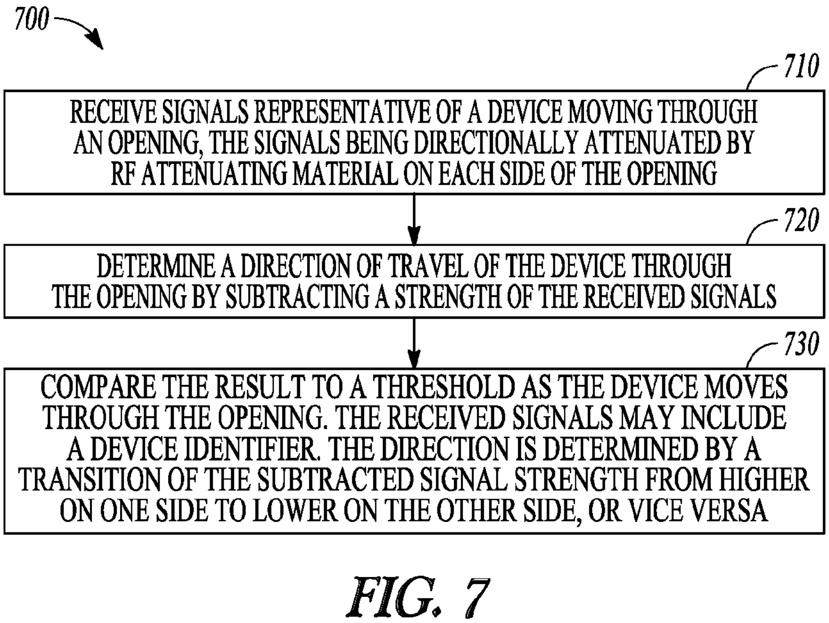
FIG. 7 is a flowchart illustrating a method of determining direction of travel through an opening according to an example embodiment.

FIG. 7 is a flowchart illustrating a method 700 of determining a direction of travel through an opening. Method 700 begins by receiving signals at 710 representative of a device moving through an opening, the signals being directionally attenuated by RF attenuating material on each side of the opening. Method 700 then determines a direction of travel of the device through the opening by subtracting a strength of the received signals at 720 and comparing the result to a threshold as the device moves through the opening at 730. The received signals include a device identifier in one embodiment.

In one embodiment, the signals are received by a first sensor mounted on the RF attenuating material on a first side of the opening and by a second sensor mounted on the RF attenuating material mounted on a second side of the opening. In one embodiment, the signals are emitted from the device. If a subtracted value corresponding to the second sensor being subtraced from the first sensor is positive, and transitions to negative, the device moved through the opening from the first side to the second side. Vice versa, if the subtracted value representing signal strengths corresponding to the second sensor being subtracted from the first sensor is negative and transitions to positive, the device moved through the opening from the second side to the first side. In further embodiments, the value corresponding to the first sensor may be subtracted from the corresponding second sensor value, in which case the transitions noted above will be reversed.

Figure 8:
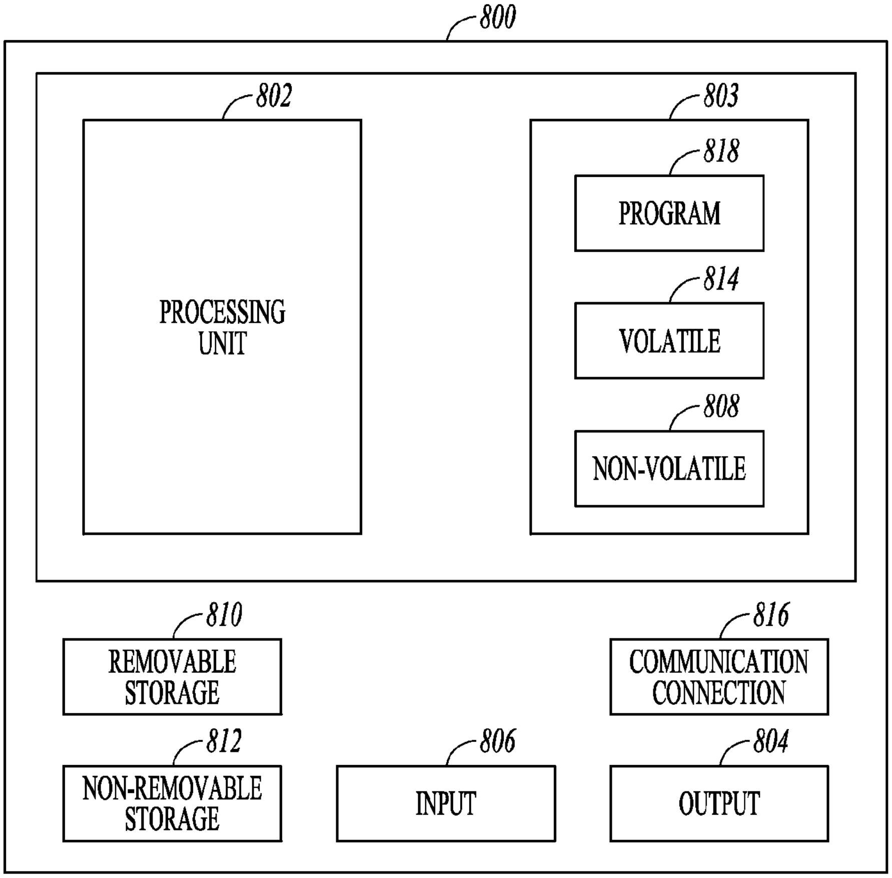
FIG. 8 is block diagram of electronic circuitry for implementing devices, sensors, and methods according to example embodiments.

FIG. 8 is a block schematic diagram of a computer system 800 to implement devices, sensors, and methods according to example embodiments. All components need not be used in various embodiments, such as for the sensors performing the method on received signals from the devices, the devices performing the method on received signals from the sensors, or by a central controller receiving signals from either or both the sensors and devices.

One example computing device in the form of a computer 800, may include a processing unit 802, memory 803, removable storage 810, and non-removable storage 812. Although the example computing device is illustrated and described as computer 800, the computing device may be in different forms in different embodiments. For example, the computing device may instead be a smartphone, a tablet, smartwatch, or other computing device including the same or similar elements as illustrated and described with regard to FIG. 8. Devices such as smartphones, tablets, and smartwatches are generally collectively referred to as mobile devices. Further, although the various data storage elements are illustrated as part of the computer 800, the storage may also or alternatively include cloud-based storage accessible via a network, such as the Internet.

Memory 803 may include volatile memory 814 and non-volatile memory 808. Computer 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 800 may include or have access to a computing environment that includes input 806, output 804, and a communication connection 816. Output 804 may include a display device, such as a touchscreen, that also may serve as an input device. The input 806 may include one or more of a touchscreen, touchpad, mouse, keyboard, camera, one or more device-specific buttons, one or more sensors integrated within or coupled via wired or wireless data connections to the computer 800, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 802 of the computer 800. A hard drive, CD-ROM, and RAM are some examples of articles including a non-transitory computer-readable medium such as a storage device. The terms computer-readable medium and storage device do not include carrier waves. For example, a computer program 818 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 800 to provide generic access controls in a COM based computer network system having multiple users and servers.

EXAMPLES

1. A system comprising:

a first sensor supported proximate an opening having an RF attenuating material such that signals emitted from first sensor are stronger on a first side of the opening than on a second side of the opening; and a second sensor supported proximate the opening having an RF attenuating material such that signals emitted from the second sensor are stronger on the second side of the opening than on the first side of the opening.

2. The system of example 1 wherein the signals emitted from the first and second sensors include a sensor identifier.

3. The system of any of examples 1-2 and further comprising circuitry to obtain received signal strength indications representative of distance from the opening of a device receiving the signals.

4. The system of example 3 wherein the circuitry processes the signal strength indications to determine a direction of travel of the device.

5. The system of example 4 wherein the circuitry receives signal strength indications as the device moves from one side of the opening to the other.

6. The system of example 5 wherein the circuitry subtracts the signal strength indications from each other and compares the result to a threshold to determine a direction of travel of the device.

7. The system of any of examples 3-6 and further comprising a device to communicate with the sensors, the device containing an identifier.

8. The system of example 7 wherein the device comprises a smart phone that receives the beacon signals, determines a strength of the received sensor signals, and transmits the determined strength and a smart phone identifier.

9. The system of any of examples 7-8 wherein the sensors receive device responses to the signals emitted from the sensors.

10. The system of any of examples 1-9 wherein the opening comprises a door frame including the RF attenuating material one both the first and second sides of the opening, and wherein the first sensor is mounted on the RF attenuating material on the first side of the opening and the second sensor is mounted on the RF attenuating material on the second side of the opening.

11. The system of any of examples 1-10 wherein the first and second sensors each comprise multiple first and second sensors supported on respective sides of the opening.

12. The system of any of examples 1-11 wherein the first and second sensors comprise limited range wireless devices.

13. A method comprising:

receiving signals representative of a device moving through an opening, the signals being directionally attenuated by RF attenuating material on each side of the opening; and determining a direction of travel of the device through the opening by subtracting a strength of the received signals and comparing the result to a threshold as the device moves through the opening.

14. The method of example 13 wherein the received signals include a device identifier.

15. The method of any of examples 13-14 wherein the signals are received by a first sensor mounted on the RF attenuating material on a first side of the opening and by a second sensor mounted on the RF attenuating material mounted on a second side of the opening.

16. The method of example 15 and further comprising emitting signals from the sensors for receipt by the device.

17. The method of example 16 wherein the received signals are signals from the device.

18. A machine readable storage device having instructions for execution by a processor of the machine to perform a method comprising:

receiving signals representative of a device moving through an opening, the signals being directionally attenuated by RF attenuating material on each side of the opening; and determining a direction of travel of the device through the opening by subtracting a strength of the received signals and comparing the result to a threshold as the device moves through the opening.

19. The machine readable storage device of example 18 wherein the received signals include a device identifier.

20. The machine readable storage device of any of examples 18-19 wherein the signals are received by a first sensor mounted on the RF attenuating material on a first side of the opening and by a second sensor mounted on the RF attenuating material mounted on a second side of the opening.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A system comprising:

a first sensor supported proximate an opening having an RF attenuating material such that signals emitted from first sensor are stronger on a first side of the opening than on a second side of the opening; and a second sensor supported proximate the opening having an RF attenuating material such that signals emitted from the second sensor are stronger on the second side of the opening than on the first side of the opening.

2. The system of claim 1 wherein the signals emitted from the first and second sensors include a sensor identifier.

3. The system of claim 1 and further comprising circuitry to obtain received signal strength indications representative of distance from the opening of a device receiving the signals.

4. The system of claim 3 wherein the circuitry processes the signal strength indications to determine a direction of travel of the device.

5. The system of claim 4 wherein the circuitry receives signal strength indications as the device moves from one side of the opening to the other.

6. The system of claim 5 wherein the circuitry subtracts the signal strength indications from each other and compares the result to a threshold to determine a direction of travel of the device.

7. The system of claim 3 and further comprising a device to communicate with the sensors, the device containing an identifier.

8. The system of claim 7 wherein the device comprises a smart phone that receives the beacon signals, determines a strength of the received sensor signals, and transmits the determined strength and a smart phone identifier.

9. The system of claim 7 wherein the sensors receive device responses to the signals emitted from the sensors.

10. The system of claim 1 wherein the opening comprises a door frame including the RF attenuating material one both the first and second sides of the opening, and wherein the first sensor is mounted on the RF attenuating material on the first side of the opening and the second sensor is mounted on the RF attenuating material on the second side of the opening.

11. The system of claim 1 wherein the first and second sensors each comprise multiple first and second sensors supported on respective sides of the opening.

12. The system of claim 1 wherein the first and second sensors comprise limited range wireless devices.

13. A method comprising:

receiving signals representative of a device moving through an opening, the signals being directionally attenuated by RF attenuating material on each side of the opening; and determining a direction of travel of the device through the opening by subtracting a strength of the received signals and comparing the result to a threshold as the device moves through the opening.

14. The method of claim 13 wherein the received signals include a device identifier.

15. The method of claim 13 wherein the signals are received by a first sensor mounted on the RF attenuating material on a first side of the opening and by a second sensor mounted on the RF attenuating material mounted on a second side of the opening.

16. The method of claim 15 and further comprising emitting signals from the sensors for receipt by the device.

17. The method of claim 16 wherein the received signals are signals from the device.

18. A non-transitory machine readable storage device having instructions for execution by a processor of the machine to perform a method comprising:

receiving signals representative of a device moving through an opening, the signals being directionally attenuated by RF attenuating material on each side of the opening; and determining a direction of travel of the device through the opening by subtracting a strength of the received signals and comparing the result to a threshold as the device moves through the opening.

19. The non-transitory machine readable storage device of claim 18 wherein the received signals include a device identifier.

20. The non-transitory machine readable storage device of claim 18 wherein the signals are received by a first sensor mounted on the RF attenuating material on a first side of the opening and by a second sensor mounted on the RF attenuating material mounted on a second side of the opening.

* * * * *